United States Patent
Choe et al.

(10) Patent No.: US 7,446,902 B2
(45) Date of Patent: Nov. 4, 2008

(54) APPARATUS AND METHOD FOR CONVERTING COLOR SIGNAL, AND COMPUTER-READABLE RECORDING MEDIUM FOR STORING COMPUTER PROGRAM FOR CONTROLLING THE APPARATUS

(75) Inventors: Wonhee Choe, Gyeongju-si (KR); Yuntae Kim, Daegu-si (KR); Dongwoo Kang, Daegu-si (KR); Seongdeok Lee, Suwon-si (KR); Hyunwook Ok, Goyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 700 days.

(21) Appl. No.: 11/186,758

(22) Filed: Jul. 22, 2005

(65) Prior Publication Data

US 2006/0290956 A1    Dec. 28, 2006

(30) Foreign Application Priority Data

Jul. 23, 2004    (KR)    ............... 10-2004-0057542

(51) Int. Cl.
*G06F 15/00* (2006.01)
*G06K 1/00* (2006.01)
*H04N 1/60* (2006.01)
*H04N 1/46* (2006.01)

(52) U.S. Cl. ............................ 358/1.9; 358/515
(58) Field of Classification Search ............... 358/1.9, 358/1.2, 3.07, 3.09, 3.1, 515, 517, 518, 519, 358/521
See application file for complete search history.

(56) References Cited

U.S. PATENT DOCUMENTS 5,495,340 A * 2/1996 Naito et al. ............... 358/296
7,146,042 B2 * 12/2006 Chen ........................ 382/167

* cited by examiner

*Primary Examiner*—Douglas Q Tran
(74) *Attorney, Agent, or Firm*—Staas & Halsey LLP

(57) ABSTRACT

An apparatus and a method for converting a color signal and a computer-readable recording medium storing a computer program for controlling the apparatus. The apparatus converts an input color signal including first through $m^{th}$ input color components into an output color signal including first through $n^{th}$ ($n>m$) output color components. The apparatus includes: a combination extractor which extracts combinations for the first through $n^{th}$ output color components; a coefficient generator which generates a coefficient for representing the input color signal using the input color signal and the extracted combinations; a combination selector which selects desired combinations among the extracted combinations using the coefficient; and an output unit which generates the output color signal using the selected combinations.

17 Claims, 7 Drawing Sheets

APPARATUS AND METHOD FOR CONVERTING COLOR SIGNAL, AND COMPUTER-READABLE RECORDING MEDIUM FOR STORING COMPUTER PROGRAM FOR CONTROLLING THE APPARATUS

CROSS-REFERENCE TO RELATED APPLICATIONS

This application claims the priority of Korean Patent Application No. 2004-0057542, filed on Jul. 23, 2004, in the Korean Intellectual Property Office, the disclosure of which is incorporated herein in its entirety by reference.

BACKGROUND OF THE INVENTION

1. Field of the Invention

The present invention relates to the field of image processing for displaying an image in a multi-primary color, and more particularly, to an apparatus and a method for converting an input color signal having m color components into an output color signal having n (>m) output color components, and a computer-readable recording medium for storing a computer program for controlling the apparatus.

2. Description of Related Art

One of several conventional multi-primary color converting methods is disclosed in U.S. Pat. No. 6,633,302 assigned to Olympus Optical Co., Ltd. When that disclosed multi-primary color converting method is applied to a system of more than five primary colors, the division of a color space becomes very complicated. Also, when neighboring colors are distributed into different selection areas, the boundaries among the neighboring colors are prominent.

Another conventional multi-primary color converting method is disclosed in International Patent No. WO 01/099557 assigned to Genoa Color Technologies, Ltd. In that disclosed multi-primary color converting method, a complicated process of computing a lookup table (LUT) is required.

In addition, a maximum saturation value and a maximum luminance value an image display device can represent vary depending on the type of used conventional multi-primary color converting methods. As a result, the quality of an output image is deteriorated.

BRIEF SUMMARY

An aspect of the present invention provides an apparatus and a method for converting an input color signal having m color components into an output color signal having n (>m) color components while fully representing a color gamut of an output display device.

An aspect of the present invention also provides a computer-readable recording medium for storing a computer program for controlling the apparatus.

According to an aspect of the present invention, there is provided an apparatus for converting an input color signal including first through $m^{th}$ input color components into an output color signal including first through $n^{th}$ (n>m) output color components. The apparatus includes: a combination extractor which extracts combinations of the first through $n^{th}$ output color components; a coefficient generator which generates a coefficient for representing the input color signal using the input color signal and the extracted combinations; a combination selector which selects desired combinations among the extracted combinations using the coefficient; and an output unit which generates the output color signal using the selected combinations.

According to another aspect of the present invention, there is provided a method of converting an input color signal including first through $m^{th}$ input color components into an output color signal including first through $n^{th}$ (n>m) output color components. The method includes: extracting combinations of the first through $n^{th}$ output color components; generating a coefficient for representing the input color signal using the input color signal and the extracted combinations; selecting desired combinations among the extracted combinations using the coefficient; and generating the output color signal using the selected combinations.

According to still another aspect of the present invention, there is provided a computer-readable recording medium for storing a computer program for controlling an apparatus for converting an input color signal including first through $m^{th}$ input color components into an output color signal including first through $n^{th}$ (n>m) output color components. The computer program includes: extracting combinations of the first through $n^{th}$ output color components; generating a coefficient for representing the input color signal using the input color signal and the extracted combinations; selecting desired combinations among the extracted combinations using the coefficient; and generating the output color signal using the selected combinations.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
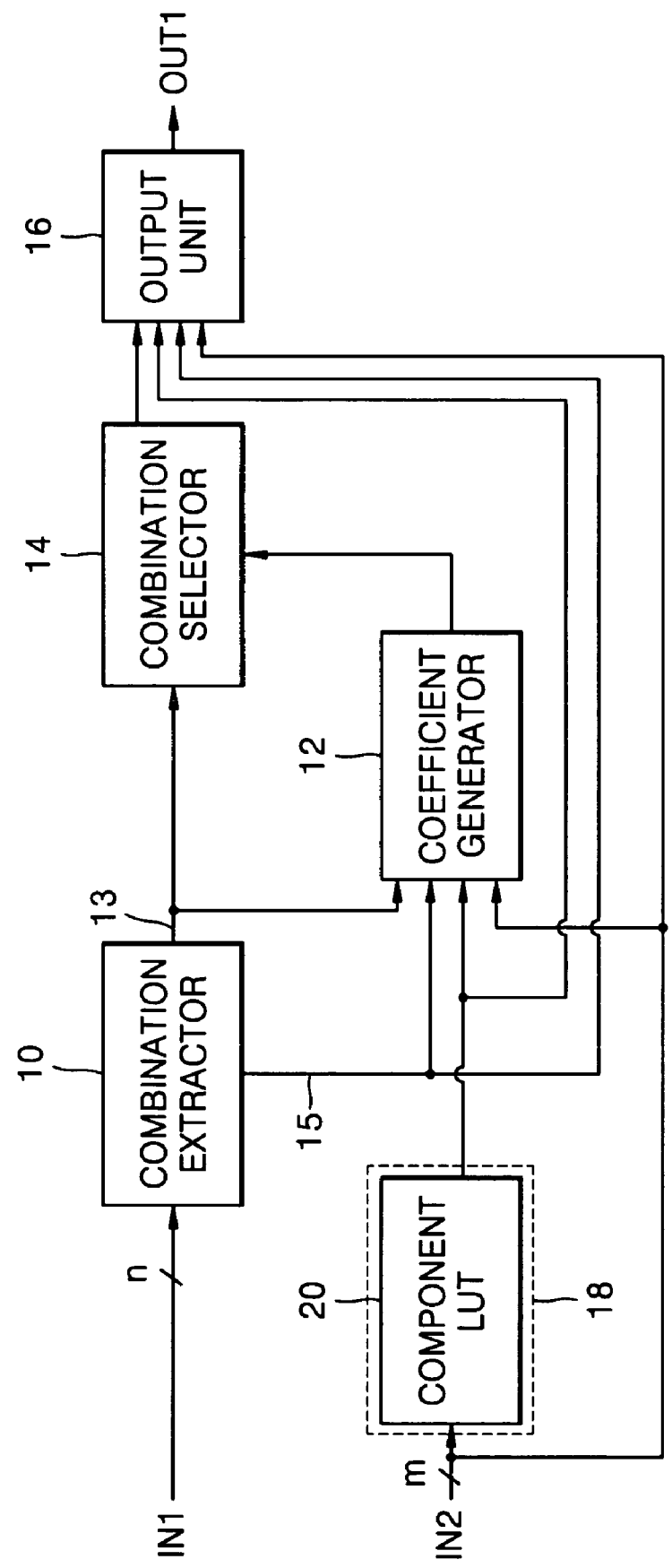
FIG. 1 is a block diagram of an apparatus for converting a color signal, according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus for converting a color signal, according to an embodiment of the present invention. Referring to FIG. 1, the apparatus includes a combination extractor 10, a coefficient generator 12, a combination selector 14, an output unit 16, and a color component converter 18.

Figure 2:
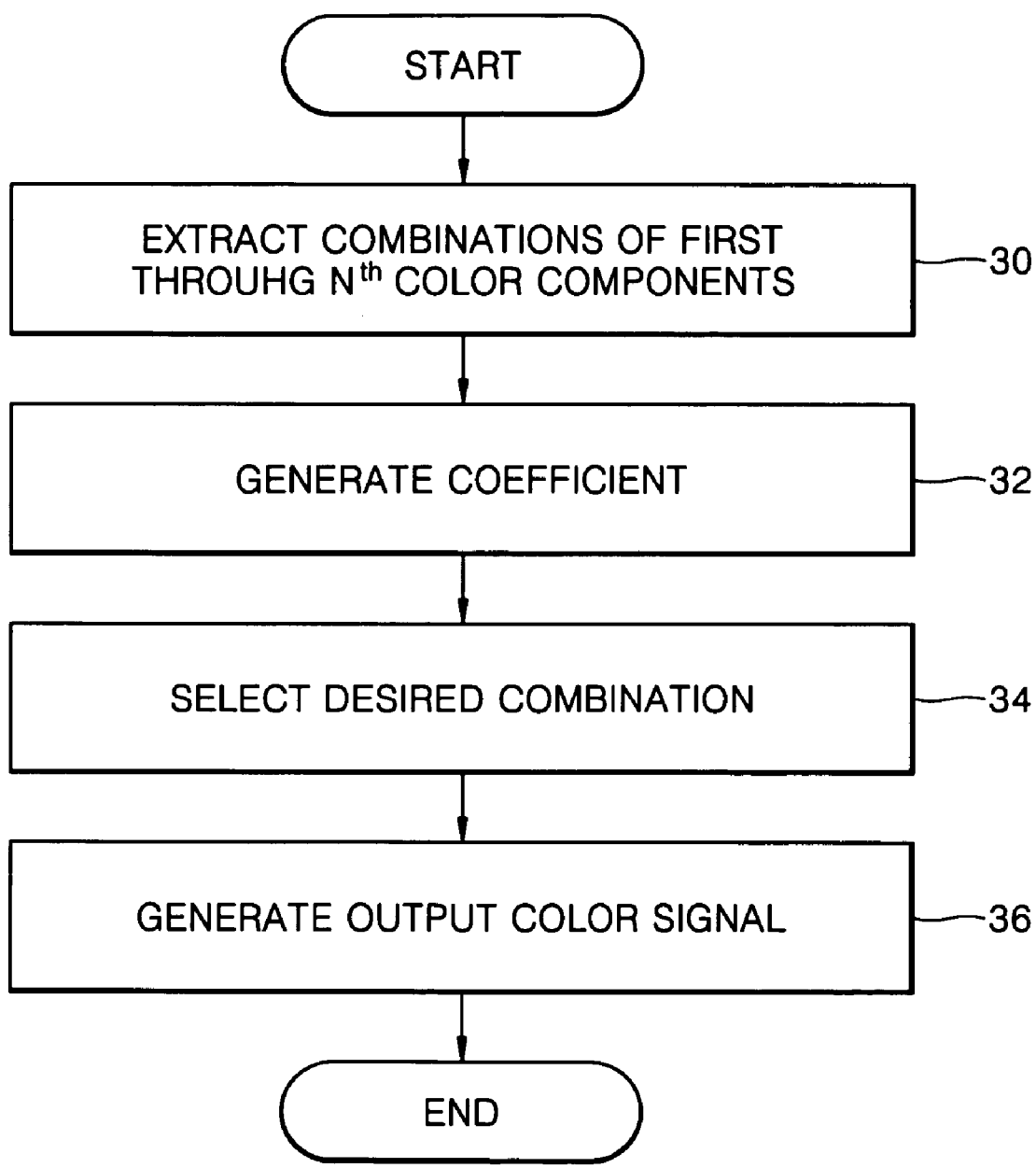
FIG. 2 is a flowchart for explaining a method of converting a color signal, according to an embodiment of the present invention.

FIG. 2 is a flowchart for explaining a method of converting a color signal, according to an embodiment of the present invention. Here, the method includes operations 30, 32, and 34 of obtaining desired combinations of output color components and operation 36 of generating an output color signal. The method of FIG. 2 may be performed by the apparatus of FIG. 1. Thus, for ease of explanation only, the method of FIG. 2 and the apparatus of FIG. 1 are described in conjunction with each other. However, it is to be understood that the method of FIG. 2 can be performed by apparatuses of other configurations and that the apparatus of FIG. 1 can perform other methods.

The apparatus of the present embodiment converts an input color signal having first through $m^{th}$ input color components into an output color signal having first through $n^{th}$ output color components. Here, n is larger than m.

In operation 30, the combination extractor 10 of FIG. 1 extracts combinations 13 of first through $n^{th}$ output color components input via an input node IN1 and outputs the extracted combinations 13 to each of the combination selector 14 and the coefficient generator 12. In other words, the combination extractor 10 divides an output color space to which the first through $n^{th}$ output color components belong and extracts possible candidate combinations from the divided output color space.

Figure 3:
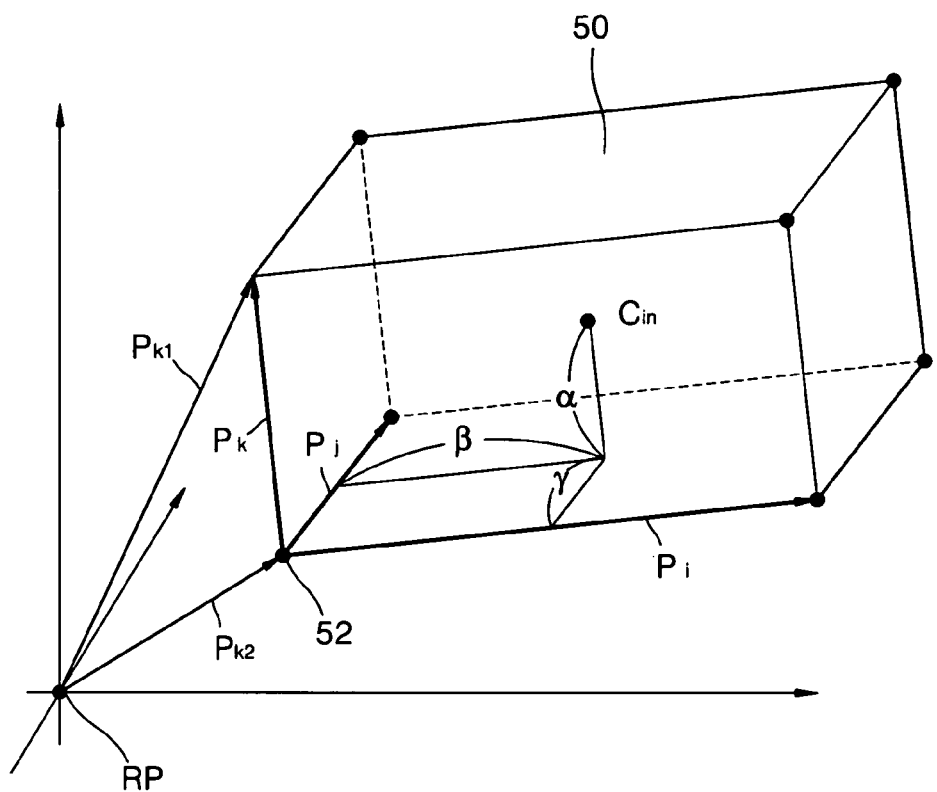
FIG. 3 is a view for illustrating an example of a polyhedron represented on an intermediate color space.

FIG. 3 is a view for illustrating an example of a polyhedron represented on an intermediate color space.

The combination extractor 10 of FIG. 1 may convert the extracted combinations 13 into position vectors and output the position vectors. Here, the position vectors include position components for indicating positions of points belonging to an internal space of a polyhedron represented on an intermediate color space and bias components of the polyhedron. Here, the intermediate color space refers to a color space which mediates between an input color space and an output color space and includes coordinate axes of more than three dimensions. In other words, an arbitrary point on the input color space may be matched with a point on the intermediate color space, and an arbitrary point on the output color space may be matched with a point on the intermediate color space. Also, the bias components of the polyhedron refer to distance components between vertexes of the polyhedron on the intermediate color space and a reference point on the intermediate color space.

For example, the polyhedron may be a hexahedron 50 as shown in FIG. 3, and the intermediate color space may be an LAB color space. Here, the position components may be $P_i$, $P_j$, and $P_k$, and in a case of FIG. 3, a bias component may be a distance component $P_{k2}$ between a reference point RP on the intermediate color space and a vertex 52 of the hexahedron 50.

Figure 4:
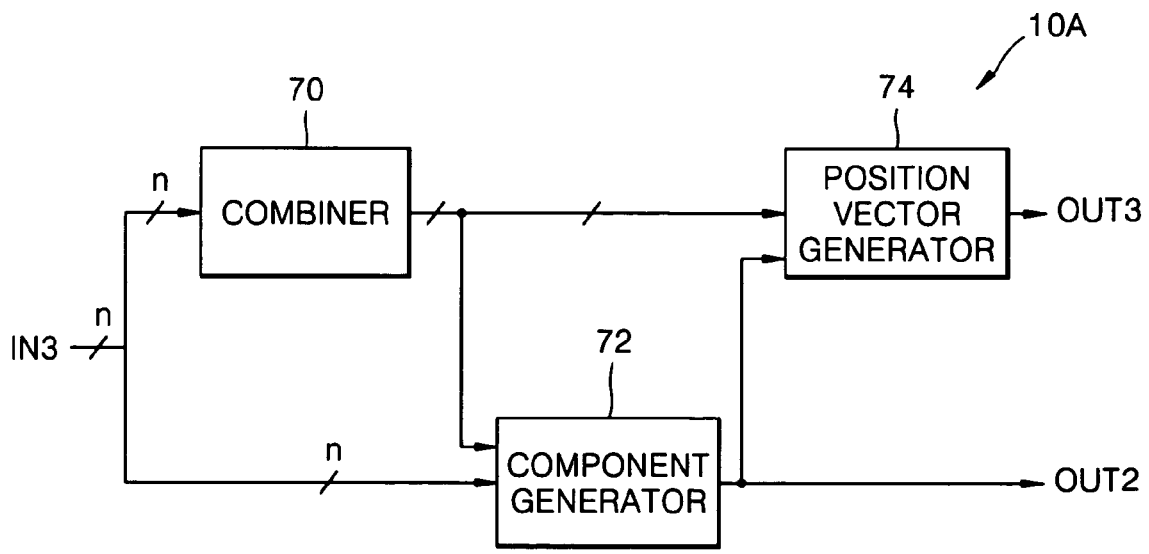
FIG. 4 is a block diagram of an example of the combination extractor of FIG. 1.

FIG. 4 is a block diagram of an example 10A of the combination extractor 10 of FIG. 1, including a combiner 70, a component generator 72, and a position vector generator 74.

The combiner 70 of FIG. 4 extracts possible combinations of a specified number of output color components from the first through $n^{th}$ output color components input via an input node IN3 and outputs the extracted combinations to each of the component generator 72 and the position vector generator 74. Here, the specified number is less than a number of coordinate axes of the polyhedron and as few as a number of bias components of the polyhedron. As shown in FIG. 3, in a case where a number of coordinate axes for describing coordinates of an arbitrary point belonging to an internal space of the hexahedron 50 is 3, and only the bias component $P_{k2}$ exists, the specified number is 2, and a combination of $P_i$ and $P_j$ is extracted. Here, a number of extracted combinations can be represented as in Equation 1:

$$n_c = {_nC_Q} = \frac{n!}{(n-Q)! \times Q!} \quad (1)$$

wherein $n_c$ denotes the number of extracted combinations, and Q denotes the specified number.

For example, when n=5, first through fifth output color components are red (R), green (G), blue (B), cyan (C), and yellow (Y), and the specified number is 2 as shown in FIG. 3, ten types of combination of $P_i$ and $P_j$. i.e., RG, RB, RC, RY, GB, GC, GY, BC, BY, and CY are extracted.

The component generator 72 generates a position component including a bias component among the position components using the first through $n^{th}$ output color components input via the input node IN3 and the combinations input from the combiner 70 and outputs the position component to the position vector generator 74. Here, the component generator 72 outputs a bias component 15 to each of the coefficient generator 12 and the output unit 16 via an output node OUT2.

For example, as shown in FIG. 3, the component generator 72 generates the position component $P_k$ including the bias component $P_{k2}$ among the position components $P_i$, $P_j$, and $P_k$. Here, as shown in FIG. 3, the position component $P_k$ can be represented as in Equation 2:

$$P_k = P_{k1} - P_{k2} \quad (2)$$

wherein bias components $P_{k1}$ and $P_{k2}$ can be represented as in Equation 3:

$$P_{k1} = \sum_{s=1}^{n} (\sigma_s^1 \cdot P_s) \quad (3)$$

$$P_{k2} = \sum_{s=1}^{n} (\sigma_s^2 \cdot P_s)$$

wherein $P_s$ denotes each of the first through $n^{th}$ output color components, and $\sigma_s^1$ and $\sigma_s^2$ can be represented as in Equations 4 and 5, respectively:

$$\sigma_s^1 = \begin{Bmatrix} 1 & s \in \{s | P_s \cdot (P_i \times P_j) < 0\} \\ & 0 \text{ otherwise} \end{Bmatrix} \quad (4)$$

$$\sigma_s^1 = \begin{Bmatrix} 1 & s \in \{s | P_s \cdot (P_i \times P_j) > 0\} \\ & 0 \text{ otherwise} \end{Bmatrix} \quad (5)$$

The position vector generator 74 generates a position vector using the combinations extracted by the combiner 70 and the position component generated by the component generator 72 and outputs the position vector 13 to each of the combination selector 14 and the coefficient generator 12 via an output node OUT3. In a case of FIG. 3, a position vector $M_{cubic}$ can be represented as in Equation 6:

$$M_{CUBIC} = \begin{bmatrix} P_i \\ P_j \\ P_k \end{bmatrix} \quad (6)$$

Figure 5:
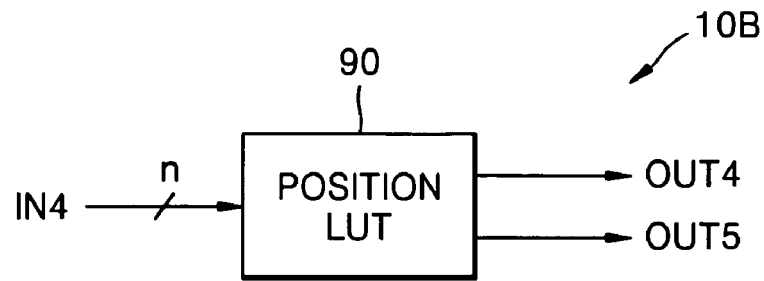
FIG. 5 is a block diagram of another example of the combination extractor of FIG. 1.

FIG. 5 is a block diagram of another example 10B of the combination extractor 10 of FIG. 1, including a position LUT 90.

The position LUT 90 outputs a corresponding position vector and a corresponding bias component among position vectors and bias components stored as data via output nodes OUT4 and OUT5, respectively, in response to the first through $n^{th}$ output color components that are input as addresses via an input node IN4. In the case of FIG. 3, the position LUT 90 outputs the position vector $M_{CUBIC}$ of Equation 6 via the output node OUT4 and the bias component $P_{k2}$ via the output node OUT5.

After operation 30, in operation 32, the coefficient generator 12 of FIG. 1 generates a coefficient for representing the input color signal using the input color signal having the first through $m^{th}$ input color components input via an input node IN2, the combinations 13 extracted by the combination extractor 10, and the bias component 15 input from the combination extractor 10 and outputs the coefficient to the combination selector 14.

Here, the first through $m^{th}$ input color components input via the input node IN2 may not be components on the intermediate color space. Thus, the apparatus of FIG. 1 may further include the color component converter 18 to convert the first through $m^{th}$ input color components into the components on the intermediate color space. Here, the first through $m^{th}$ input color components are converted into the components on the intermediate color space in order to represent the combinations 13 extracted by the combination extractor 10 as the components on the intermediate color space. In addition, only when input color components the coefficient generator 12 uses to generate the coefficient must be equal to color components of the combinations extracted by the combination extractor 10, the combination selector 14 can select desired combinations as described later.

The color component converter 18 of FIG. 1 converts the first through $m^{th}$ input color components of the input color signal input via the input node IN2 into the components on the intermediate color space and outputs the first through $m^{th}$ input color components including the components on the intermediate color space to the coefficient generator 12. For example, when m=3, the first through third input color components are R, G, and B color components, and the intermediate color space is an LAB color space, the color component converter 18 converts the R, G, an B input color components into LAB input color components and outputs an input color signal having the LAB input color components to the coefficient generator 12. According to the present invention, for this purpose, the color component converter 18 of FIG. 1 may be realized as a component LUT 20. Here, the component LUT 20 stores the components on the intermediate color space as data and outputs data corresponding to the first through $m^{th}$ input color components of the input color signal, which are input as the addresses via the input node IN2, as components of the input color signal to the coefficient generator 12.

In this case, the coefficient generator 12 generates the coefficient using the input color signal having the converted color components output from the color component converter 18 and the combinations 13 and the bias component 15 input from the combination extractor 10 and outputs the coefficient to the combination selector 14.

Figure 6:
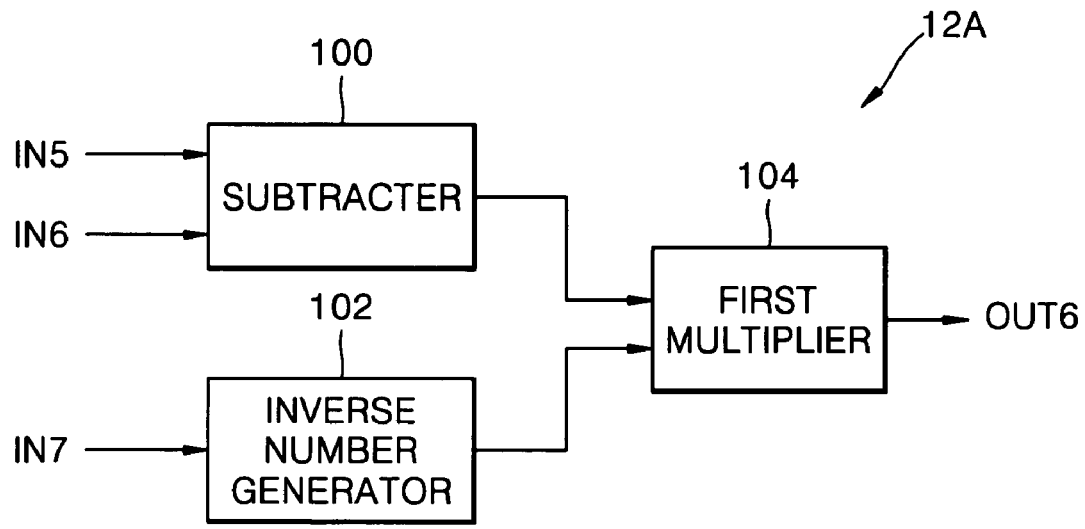
FIG. 6 is a block diagram of an example of the coefficient generator of FIG. 1.

FIG. 6 is a block diagram of an example 12A of the coefficient generator 12 of FIG. 1, including a subtracter 100, an inverse number generator 102, and a first multiplier 104.

The subtracter 100 subtracts the bias component 15 input from the combination extractor 10 via an input node IN6 from the input color signal input via an input node IN5 and outputs the subtraction result to the first multiplier 104.

Here, the inverse number generator 102 generates an inverse number of the position vector 13 input from the combination extractor 10 via an input node IN7 and outputs the inverse number to the first multiplier 104.

The first multiplier 104 multiplies the subtraction result of the subtracter 100 by the inverse number generated by the inverse number generator 102 and outputs the multiplication result as the coefficient to the combination selector 14 via an output node OUT6.

For example, in a case of FIG. 3, the coefficient generator 12A of FIG. 6 generates a coefficient $C_{color}$ as in Equation 7:

$$C_{Color} = M_{CUBIC}^{-1} \cdot (C_{in} - P_{k2}) \quad (7)$$

wherein $M_{CUBIC}^{-1}$ denotes the inverse number of the position vector $M_{CUBIC}$, $C_{in}$ denotes the input color signal, and $P_{k2}$ denotes the bias component. Here, Equation 7 can be derived from Equation 8:

$$C_{in} = M_{CUBIC} \cdot C_{color} + P_{k2} \quad (8)$$

wherein, when $C_{color}$ is represented as in Equation 9, $C_{in}$ can be represented as in Equation 10 or 11:

$$C_{color} = [\alpha \beta \gamma] \quad (9)$$

wherein $\alpha$, $\beta$, and $\gamma$ denote sizes of the position components $P_k$, $P_i$, and $P_j$ of $C_{in}$, respectively, as shown in FIG. 3.

$$C_{in} = \alpha \cdot P_{k1} + (1-\alpha) \cdot P_{k2} + \beta \cdot P_i + \gamma \cdot P_j \quad (10)$$

$$C_{in} = \alpha \cdot P_k + \beta \cdot P_i + \gamma \cdot P_j + P_{k2} \quad (11)$$

After operation 32, in operation 34, the combination selector 14 selects desired combinations among the extracted combinations input from the combination extractor 10 using the coefficient generated by the coefficient generator 12 and outputs the selected combinations to the output unit 16.

Figure 7:
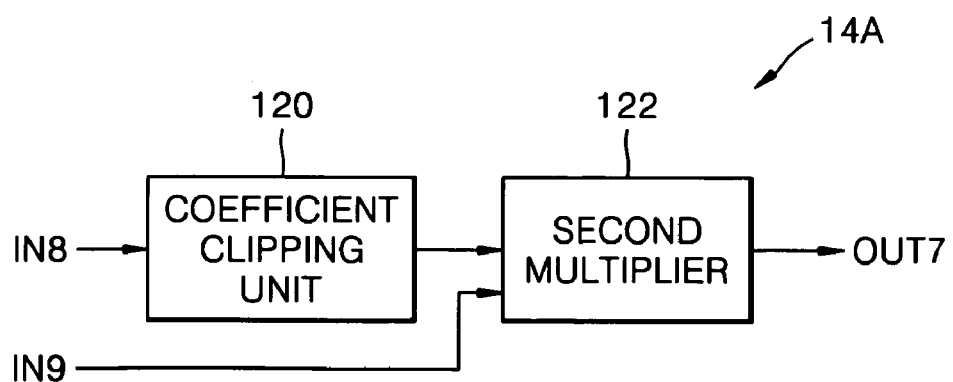
FIG. 7 is a block diagram of an example of the combination selector of FIG. 1.

FIG. 7 is a block diagram of an example 14A of the combination selector 14 of FIG. 1, including a coefficient clipping unit 120 and a second multiplier 122.

The coefficient clipping unit 120 of FIG. 7 selects only coefficients belonging to a specified range in which the input color signal can be represented, among coefficients input from the coefficient generator 12 via an input node IN8 and outputs the selected coefficients to the second multiplier 122. For example, the specified range may be between 0 and 1. The second multiplier 122 multiplies the extracted combinations represented in the position vectors input from the combination extractor 10 via an input node IN9 by an output of the coefficient clipping unit 120 and outputs the multiplication results as the selected combinations to the output unit 16 via an output unit OUT7.

For example, when coefficients not belonging to the specified range in which the input color signal can be represented are input, the coefficient clipping unit 120 of the combination selector 14A of FIG. 7 outputs "0" to the second multiplier 122. Therefore, combinations corresponding to the coefficients not belonging to the specified range may not be output via the second multiplier 122.

After operation 34, in operation 36, the output unit 16 generates the output color signal using the combinations selected by the combination selector 14 and outputs the output color signal via an output node OUT1. Here, the output color signal can be represented as in Equation 12:

$$\sum_{s=1}^{n} \delta_s P_s \quad (12)$$

wherein $P_S$ denotes each of the first through $n^{th}$ output color components, and $\delta_s$ the size of $P_s$.

Figure 8:
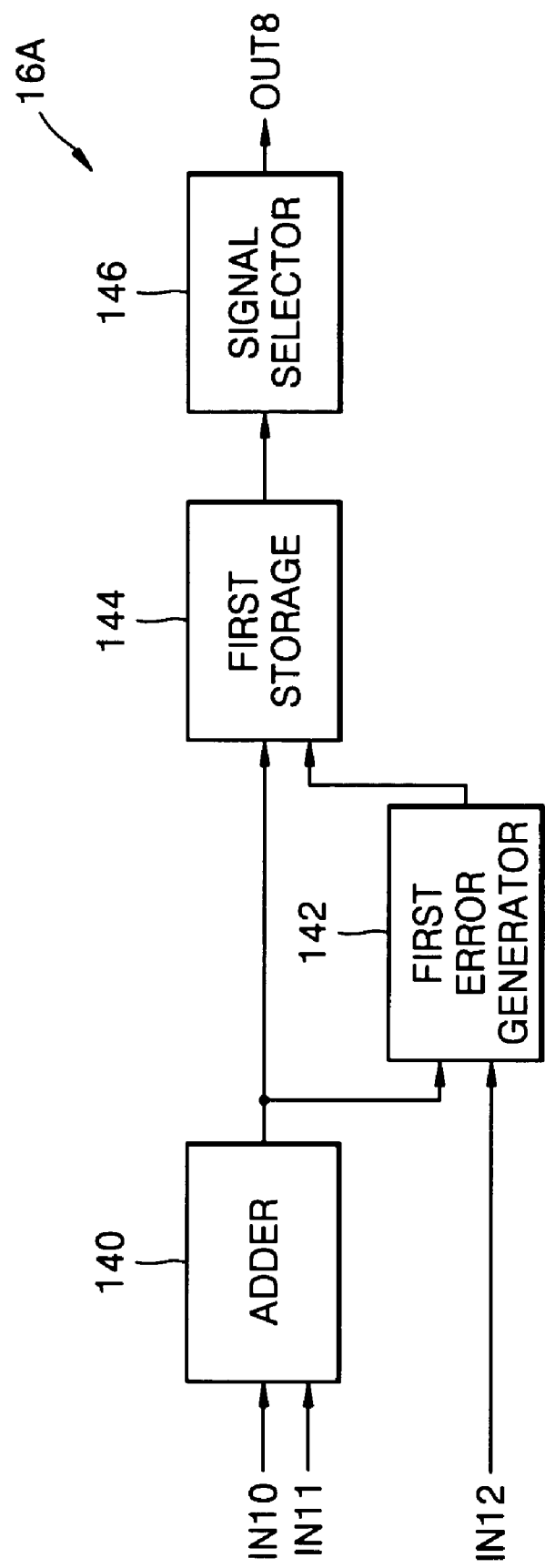
FIG. 8 is a block diagram of an example of the output unit of FIG. 1.

FIG. 8 is a block diagram of an example 16A of the output unit 16 of FIG. 1, including an adder 140, a first error generator 142, a first storage 144,. and a signal selector 146.

The adder 140 adds the selected combinations input from the combination selector 14 via an input node IN10 to the bias component 15 input from the combination extractor 10 via an input node IN11 and outputs the addition result to each of the first error generator 142 and the first storage 144.

Here, the first error generator 142 generates an error between the addition result input from the adder 10 and the first through $m^{th}$ input color components input via an input node IN12 and outputs the error to the first storage 144.

The first storage 144 matches the addition result of the adder 140 with the error generated by the first error generator 142 to accumulate and store the addition result and the error. Here, the signal selector 146 selects the smallest error among the errors stored in the first storage 144, reads the addition result used for generating the selected smallest error as the output color signal from the first storage 144, and outputs the output color signal via an output node OUT8.

Figure 9:
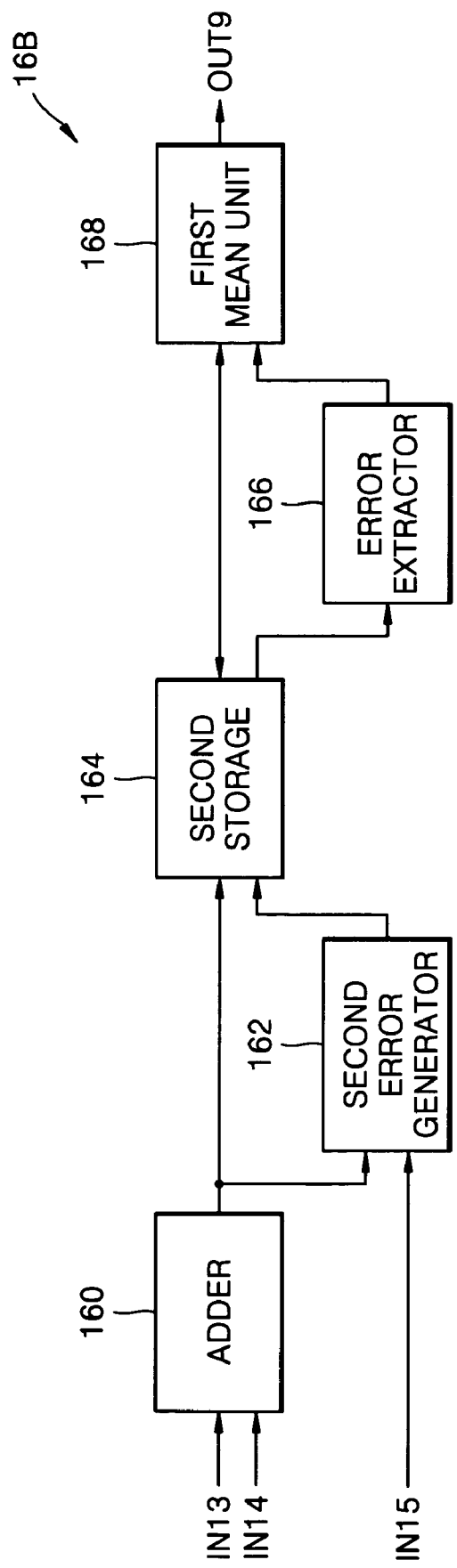
FIG. 9 is a block diagram of another example of the output unit of FIG. 1.

FIG. 9 is a block diagram of another example 16B of the output unit 16 of FIG. 1, including an adder 160, a second error generator 162, a second storage 164, an error extractor 166, and a first mean unit 168.

The adder 160 adds the selected combinations input from the combination selector 14 via an input node IN13 to the bias component 15 input from the combination extractor 10 via an input node IN14 and outputs the addition result to each of the second error generator 162 and the second storage 164.

The second error generator 162 generates an error between the addition result of the adder 160 and the first through $m^{th}$ input color components input via an input node IN15 and outputs the error to the second storage 164.

The second storage 164 matches the addition result of the adder 160 with the error generated by the second error generator 162 to accumulate and store the addition result and the error. Here, the error extractor 166 extracts errors equal to or less than a specified value among the errors accumulated and stored in the second storage 164 and outputs the extracted errors to the first mean unit 168.

Here, the first mean unit 168 reads addition results corresponding to the errors extracted by the error extractor 166 from the second storage 164 and outputs a mean of the read addition results as the output color signal via an output node OUT9.

Figure 10:
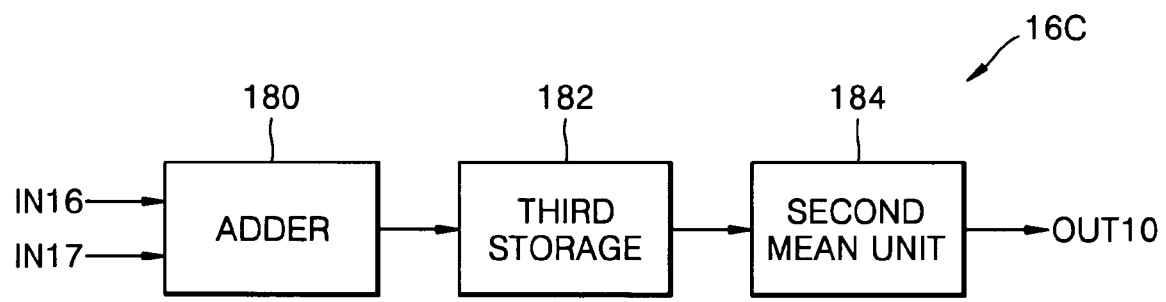
FIG. 10 is a block diagram of still another example of the output unit of FIG. 1.

FIG. 10 is a block diagram of still another example 16 C of the output unit 16 of FIG. 1, including an adder 180, a third storage 182, and a second mean unit 184.

The adder 180 adds the selected combinations input from the combination selector 14 via an input node IN16 to the bias component 15 input from the combination extractor 10 via an input node IN17 and outputs the addition result to the third storage 182.

The third storage 182 accumulates and stores the addition result of the adder 180. Here, the second mean unit 184 outputs a mean of addition results read from the third storage 182 as the output color signal via an output node OUT10.

The output unit 16 of FIG. 1 may include only the adder 140, 160, or 180. In this case, the adder 160 adds the selected combinations input from the combination selector 14 to the bias component 15 input from the combination extractor 10 and outputs the addition result as the output color signal.

In a case where the color component converter 18 is included, the adder 140, 160, or 180 of FIG. 8, 9, or 10 receives the first through $m^{th}$ input color components from the color component converter 18. However, in a case where the color component converter 18 is not included, the adder 140, 160, or 180 receives the first through $m^{th}$ input color components from the outside of the apparatus of FIG. 1.

A computer-readable storage medium storing a computer program for controlling an apparatus for converting a color signal, according to the present invention, will now be explained.

The computer-readable recording medium storing a computer program controls a color signal converter for converting an input color signal having first through $m^{th}$ input color components into an output color signal having first through $n^{th}$ output color components. For this purpose, the computer program performs: extracting combinations of the first through $n^{th}$ output color components; generating a coefficient for representing the input color signal using the input color signal and the extracted combinations; selecting desired combinations among the extracted combinations using the coefficient; and generating the output color signal using the selected combinations.

In an apparatus and a method for converting a color signal, according to the above-described embodiments of the present invention, and a computer-readable recording medium for storing a computer program for controlling the apparatus, an input color signal can be correctly represented without an error using a display device. Also, since all combinations of representable output color components are considered, a color gamut of the display device can be maximally used. In addition, an input color signal having a limited number, m, of color components can be easily converted into an output color signal having a larger number, n, of color components. Moreover, the output color signal can be generated as described with reference to FIG. 8, 9, or 10. As a result, the discontinuation of color representation can prevent from being occurred during the representation of a neighboring color signal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for converting an input color signal comprising first through $m^{th}$ input color components into an output color signal comprising first through $n^{th}$ (n>m) output color components, the apparatus comprising:

a combination extractor which extracts combinations for the first through $n^{th}$ output color components;

a coefficient generator which generates a coefficient for representing the input color signal using the input color signal and the extracted combinations;

a combination selector which selects desired combinations among the extracted combinations using the coefficient; and an output unit which generates the output color signal using the selected combinations.

2. The apparatus of claim 1, further comprising:
a color component converter which converts the first through $m^{th}$ input color components of the input color signal into components on an intermediate color space,
wherein the coefficient generator generates the coefficient using the converted color components of the input color signal output from the color component converter and the extracted combinations.

3. The apparatus of claim 2, wherein the color component converter comprises a component lookup table which comprises the first through $m^{th}$ input color components of the input color signal as addresses and the components on the intermediate color space as data.

4. The apparatus of claim 1, wherein the combination extractor converts the extracted combinations into position components for representing a position of an internal space of a polyhedron on an intermediate color space and a position vector comprising a bias component of the polyhedron on the intermediate color space, and outputs the converted result.

5. The apparatus of claim 4, wherein the combination extractor comprises:
a combiner which extracts a possible combination of a specified number of output color components among the first through $n^{th}$ output color components and outputs the extracted combination;
a component generator which generates a position component comprising the bias component among the position components using the first through $n^{th}$ output color components and the extracted combination; and
a position vector generator which generates the position vector using the extracted combination and the generated position component,
wherein the specified number is less than a number of coordinate axes of the polyhedron and as few as a number of the bias components.

6. The apparatus of claim 4, wherein the combination extractor comprises a position lookup table (LUT) which comprises the first through $n^{th}$ output color components as addresses and the position vector and the bias component as data.

7. The apparatus of claim 4, wherein the coefficient generator comprises:
a subtracter which subtracts the bias component input from the combination extractor from the input color signal;
an inverse number generator which generates an inverse number of the position vector; and
a first multiplier which multiplies the subtraction result by the inverse number of the position vector and outputs the multiplication result as the coefficient.

8. The apparatus of claim 4, wherein the combination selector comprises:
a coefficient clipping unit which selectively outputs only coefficients belonging to a specified range in which the input color signal is capable of being represented, among the coefficients; and
a second multiplier which multiplies the extracted combinations represented by the position vector by an output of the coefficient clipping unit and outputs the multiplication results as the selected combinations.

9. The apparatus of claim 4, wherein the output unit comprises an adder which adds the selected combinations to the bias component and outputs the addition result as the output color signal.

10. The apparatus of claim 9, wherein the output unit further comprises:

a first error generator which generates an error between the addition result and the first through $m^{th}$ input color components;
a first storage which matches the addition result with the error to accumulate and store the addition result and the error; and
a signal selector which selects the smallest error among the errors stored in the first storage and reads the addition result used for generating the selected error as the output color signal from the first storage.

11. The apparatus of claim 9, wherein the output unit further comprises:
a second error generator which generates an error between the addition result and the first through $m^{th}$ input color components;
a second storage which matches the addition result with the error to accumulate and store the addition result and the error;
an error extractor which extracts errors equal to or less than a specified value among the errors stored in the second storage; and
a first mean unit which reads the addition results corresponding to the extracted errors from the second storage and outputs a mean of the addition results as the output color signal.

12. The apparatus of claim 9, wherein the output unit further comprises:
a third storage which accumulates and stores the addition result; and
a second mean unit which outputs a mean of the addition results read from the third storage as the output color signal.

13. The apparatus of claim 5, wherein the extracted combinations are expressible by the following equation:

$$n_c = {}_nC_Q = \frac{n!}{(n-Q)! \times Q!},$$

and
wherein $n_c$ denotes the number of extracted combinations, and Q denotes the specified number.

14. The apparatus of claim 5, wherein the position component $P_k$ expressible by the following equation:

$$P_k = P_{k1} - P_{k2},$$

wherein bias components $P_{k1}$, and $P_{k2}$ are expressible by the following equations:

$$P_{k1} = \sum_{s=1}^{n}(\sigma_s^1 \cdot P_s)$$

$$P_{k2} = \sum_{s=1}^{n}(\sigma_s^2 \cdot P_s)$$

, and wherein $P_s$ denotes each of the first through $n^{th}$ output color components, and $\sigma_s^1$ and $\sigma_s^2$ are expressible by the following equations:

$$\sigma_s^1 = \left\{ \begin{array}{l} 1 \ s \in \{s | P_s \cdot (P_i \times P_j) < 0\} \\ 0 \ \text{otherwise} \end{array} \right\},$$

and

-continued $$\sigma_s^1 = \left\{ \begin{array}{c} 1 \ s \in \{s | P_s \cdot (P_i \times P_j) > 0\} \\ 0 \ \text{otherwise} \end{array} \right\}.$$

15. The apparatus of claim 7, wherein the coefficient generator generates a coefficient $C_{color}$ expressible by the following equation:

$$C_{color} = M_{CUBIC}^{-1} \cdot (C_{in} - P_{k2}), \text{ and}$$

wherein $M_{CUBIC}^{-1}$ denotes the inverse number of the position vector $M_{CUBIC}$, $C_{in}$ denotes the input color signal, and $P_{k2}$ denotes the bias component.

16. A method of converting an input color signal comprising first through $m^{th}$ input color components into an output color signal comprising first through $n^{th}$ (n>m) output color components, the method comprising:

extracting combinations for the first through $n^{th}$ output color components;

generating a coefficient for representing the input color signal using the input color signal and the extracted combinations;

selecting desired combinations among the extracted combinations using the coefficient; and generating the output color signal using the selected combinations.

17. A computer-readable recording medium storing processing instructions for causing a processor to perform a method of controlling an apparatus for converting an input color signal comprising first through $m^{th}$ input color components into an output color signal comprising first through $n^{th}$ (n>m) output color components, the method comprising:

extracting combinations of the first through $n^{th}$ output color components;

generating a coefficient for representing the input color signal using the input color signal and the extracted combinations;

selecting desired combinations among the extracted combinations using the coefficient; and generating the output color signal using the selected combinations.

* * * * *

UNITED STATES PATENT AND TRADEMARK OFFICE
CERTIFICATE OF CORRECTION

PATENT NO. : 7,446,902 B2 Page 1 of 1
APPLICATION NO. : 11/186758
DATED : November 4, 2008
INVENTOR(S) : Wonhee Choe et al.

It is certified that error appears in the above-identified patent and that said Letters Patent is hereby corrected as shown below:

Column 10, Line 46, change "$P_{k2}$." to --$P_{k2}$,--.

Column 10, Line 47, change "$P_{k1}$," to --$P_{k1}$--.

Signed and Sealed this

Seventeenth Day of February, 2009

JOHN DOLL
*Acting Director of the United States Patent and Trademark Office*